(12) United States Patent
Weatherford

(10) Patent No.: US 7,934,472 B2
(45) Date of Patent: May 3, 2011

(54) CLIMATE CONTROLLED PET SHELTER

(76) Inventor: Clyde Weatherford, Mt. Morris, MI (US)

( * ) Notice: Subject to any disclaimer, the term of this patent is extended or adjusted under 35 U.S.C. 154(b) by 107 days.

(21) Appl. No.: 12/553,359

(22) Filed: Sep. 3, 2009

(65) Prior Publication Data

US 2011/0048333 A1 Mar. 3, 2011

(51) Int. Cl.
*A01K 1/00* (2006.01)
(52) U.S. Cl. .......................... 119/448; 119/493; 119/500
(58) Field of Classification Search ................... 119/448, 119/482, 452, 484, 493, 500
See application file for complete search history.

(56) References Cited

U.S. PATENT DOCUMENTS

| | | |
|---|---|---|
| 3,962,993 A | 6/1976 | Dattilo |
| 4,332,214 A | 6/1982 | Cunningham |
| 4,827,872 A | 5/1989 | Sommers |
| 5,003,923 A | 4/1991 | Morgan |
| 5,216,977 A | 6/1993 | Allen, Jr. |
| D340,551 S | 10/1993 | Mitchell, Sr. |
| 5,746,271 A * | 5/1998 | DeCosta .......................... 165/53 |
| 5,950,615 A | 9/1999 | Anderson et al. |
| 5,975,025 A * | 11/1999 | Kangas et al. ................. 119/484 |
| 6,234,116 B1 | 5/2001 | Havener |
| 6,403,922 B1 * | 6/2002 | Hawks et al. .................. 219/385 |
| 6,637,374 B2 * | 10/2003 | Hawks et al. .................. 119/448 |
| 6,668,819 B1 * | 12/2003 | Remsburg ..................... 126/633 |

* cited by examiner

*Primary Examiner* — Yvonne R. Abbott
(74) *Attorney, Agent, or Firm* — Brooks Kushman P.C.

(57) ABSTRACT

An apparatus and method for moderating the environment of a pet shelter is provided. The apparatus may include a climate control device which may be attached to the pet shelter in order to regulate the temperature and environment within the pet shelter. The apparatus may also include a photoelectric control element electrically connected to the climate control device and operable based on the ambient light input from outside the pet shelter. The apparatus may regulate the environment of the pet shelter based on the ambient light outside of the pet shelter.

20 Claims, 3 Drawing Sheets

CLIMATE CONTROLLED PET SHELTER

BACKGROUND OF THE INVENTION

Field of the Invention

The present invention relates to a pet shelter for a pet, such as a cat or dog. In particular, the invention provides a comfortable environment for the pet during cold or hot weather. The pet shelter of the present invention may be heated or cooled with a climate control device.

SUMMARY OF THE INVENTION

One aspect of the present invention includes an apparatus for moderating the environment of a pet shelter. The apparatus may include a climate control device which may be attached to the pet shelter in order to regulate the temperature and environment within the pet shelter. The apparatus may also include a photoelectric control element electrically connected to the climate control device and operable based on the ambient light input from outside the pet shelter. The apparatus may regulate the environment of the pet shelter based on the ambient light outside of the pet shelter.

In one embodiment, the apparatus may be a heater having a heating element which is contained within a housing and adapted to provide heat to the pet shelter. In an alternate embodiment, the apparatus may include a cooling device, such as a fan, to cool the pet shelter.

In another embodiment, the photoelectric control element may include a light sensor which is configured to detect ambient light. The light sensor then generates a light signal responsive to the light which it detects. The photoelectric control element may also include a control circuit which is connected to the light sensor where the control sensor generates an output in response to the ambient light detected. The control circuit and the sensor may regulate the climate control device between at least a first and a second setting.

Another aspect of the invention may include a pet shelter having an enclosure with at least two walls and an entrance for allowing the pet entry and exit to an interior region of the enclosure which is configured to provide shelter to the pet. The shelter may have a heater which may be attached to the exterior surface of the pet shelter where the heater is adapted to be located substantially outside the pet shelter in a housing which may be weatherproof. The pet shelter may also include a photoelectric control element in electrical communication with the heating element where the photoelectric control element is operable from outside the pet shelter in order to adjust the heat within the pet shelter based on an ambient light condition outside the pet shelter.

A further aspect of the invention may include a method for moderating the temperature of a pet shelter using an climate control apparatus for moderating the environment of the pet shelter.

These and other aspects of the present invention will be better understood in view of the following drawings and detailed description of the invention.

DETAILED DESCRIPTION OF THE VARIOUS EMBODIMENTS

Figure 1:
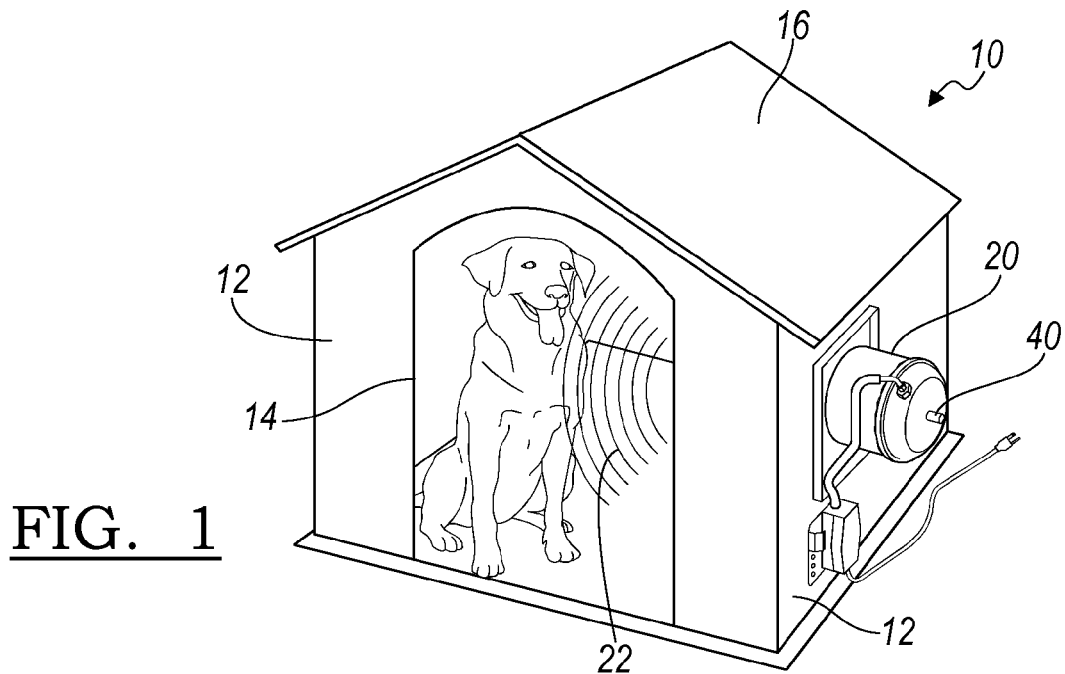
FIG. 1 illustrates an exemplary pet shelter including a climate control device of the present invention.

Referring to FIG. 1, an exemplary illustration of a climate control pet house of the present invention is provided. The pet shelter 10 may have walls 12 and a roof 16 which may define an interior region for providing shelter to a pet. The shelter 10 may also have an entrance 14 for allowing the pet to enter and exit the pet shelter 10.

The pet shelter 10 may include a climate control device 20 for providing heat or cooling of the interior region of the pet shelter. The climate control device 20 may be mounted on the pet shelter wall 12 or on the pet shelter roof 16 or any other location on the pet shelter that may be suitably adapted for mounting the climate control device 20.

The climate control device 20 may be mounted to an existing pet shelter 10. While the climate control device 20 may be configured to be located inside or outside the pet shelter 10, it is contemplated that by locating the climate control device 20 primarily outside the pet shelter 10 it would not interfere with the shelter space provided for the pet and the climate control device 20 could be easily adapted to an existing pet shelter by mounting the climate control device 20 to an aperture in the pet shelter 10. Where the climate control device 20 is adapted to be located substantially outside the pet shelter, it may be housed in a generally weather-proof housing.

The interior region of the pet shelter may be configured to provide shelter and comfort to the pet, while the exterior surface of the walls 12 and the roof 16 are adapted to be exposed to the environment. The pet shelter walls 12 may be constructed of typical materials for a pet shelter such as wood or composite, but may be constructed of any material suitable for such purpose.

As illustrated in FIG. 1, the climate control device 20 may be configured provide a variable amount of heating or cooling across the pet shelter by having a heat gradient 22. For example, if the climate control device 20, such as a heater shown in FIG. 2, was mounted on a side wall 12 of the pet shelter 10, it would be warmer in a location nearest the heater 30 and cooler at a location farther from the heater 30 as depicted in FIG. 1. This would allow the pet to adjust their position within the pet shelter to accommodate their preference of hot or cold. Depending on the placement of the climate control device 20, it is contemplated that the gradient 22 may extend from front to back, left to right, or top to bottom, or any other suitable variation, in the pet shelter 10.

Figure 2:
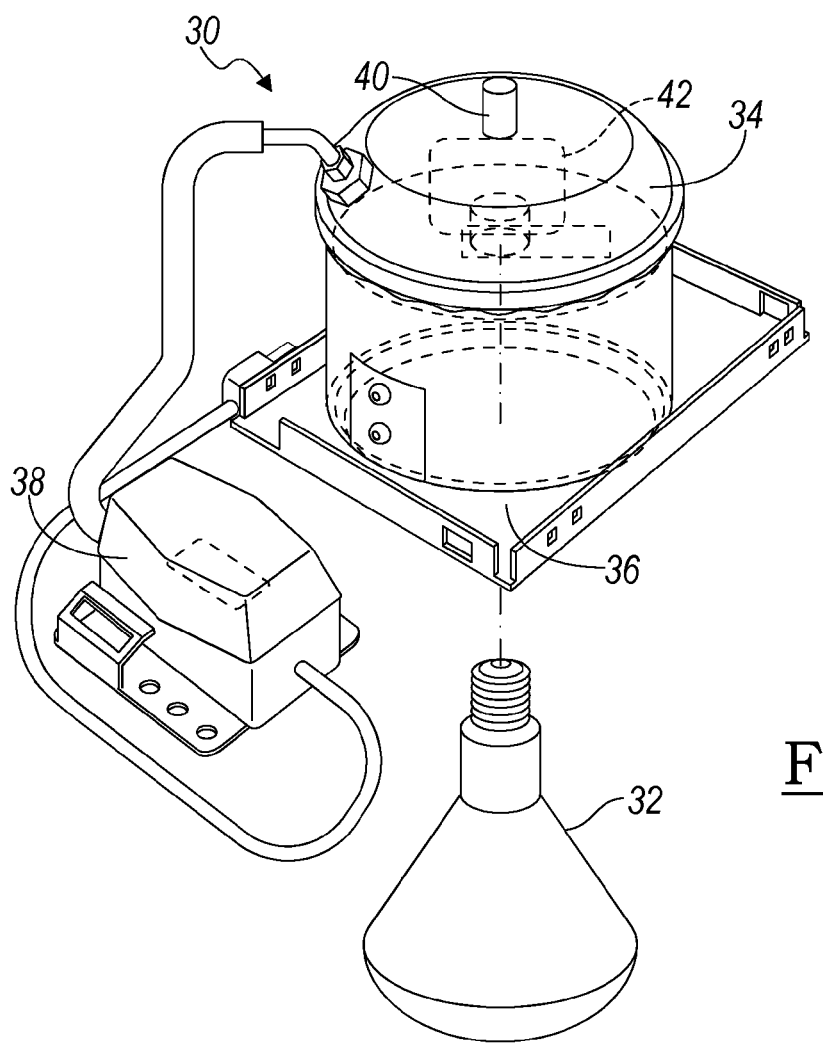
FIG. 2 illustrates a pet shelter heater of the present invention.

Turning now to FIG. 2, the climate control device 20 may be a heater 30 for providing heat to the pet shelter 10 is illustrated. The heater may include a heating element 32, which radiates heat through the interior region of the pet shelter. The heating element 32 may be an electrically resistive heating element or a infrared heating element, such as a heating bulb. It is contemplated that the heating element may also be coupled with a fan which may provide additional distribution of the heat in the interior region of the pet shelter 10.

The heating element 32 may be mounted in a housing 34. In the event that it is located substantially outside the pet shelter, the housing may be an air and waterproof enclosure or generally a weather-proof enclosure. The housing 34 may be attached to a flange 36 or have an integrally formed flange 36 which may be adapted for mounting the climate control device 20 to the pet shelter 10. The flange 36 may include a seal for providing a generally weather-proof seal between the pet shelter and the climate control device 20.

The climate control device 20 may also include a sensor 40. The sensor 40 may be a light sensor which is configured to detect ambient light. The sensor may be configured to generate a signal that is responsive to the ambient light which it detects. The sensor 40 may be a photoelectric sensor such as a dusk-to-dawn sensor.

The sensor 40 may be connected to a controller 42. The controller 42 may include a control circuit for generating an output in response to a threshold of ambient light. This sensor 40 and controller 42 may provide photoelectric control and operation of the climate control device 20. For example, in the case of the heater 30, the photoelectric controller would turn the heater 30 on when the ambient light is below a threshold level. The heater 30 would turn on after the level of light, for example at dusk, falls below a level so that the pet shelter would be provided with heat during the night when it is typically cold outside. Then, as the sun comes up during the day and when the ambient light is above the threshold level, the photoelectric control would turn the heater 30 off, when it is typically warmer outside. It is also contemplated that the photoelectric control may increase the heat during the night and decrease the heat during the day, yet always remain on and providing heat to the interior region of the pet shelter 10. Further, the photoelectric control may provide numerous settings depending on the detected ambient light.

The climate control device 20 may also be coupled with a switch 38. The switch 38 may be an on/off switch in which the climate control device 20 may be turned on or off independent of the photoelectric control. Alternatively, the switch 38 may also be a variable input switch, such as a dimmer switch, which would provide variable heat settings independent from the photoelectric control or in combination with the photoelectric control settings. For example, the dimmer switch may be adjusted provide more heat at different times of the year. It is likely that the dimmer switch could be adjusted to provide maximum heat during the winter yet be adjusted to provide less heat during the spring or fall.

It is also contemplated that the climate control device 20 may be coupled with further control devices not shown here. For example, the photoelectric control may be coupled with a thermostatic control which may be located inside or outside the pet shelter 10. For example, the thermostatic control may sense the temperature within the pet shelter 10 and then coupled with the photoelectric control may adjust the climate control device 20 to a pre-set temperature independent or in conjunction with the photoelectric control. Alternatively, a thermostatic control may sense temperature, and then in communication with the photoelectric control, keep the heater on when the temperature inside the pet shelter 10 is below a certain temperature, independent of or in cooperation with the photoelectric control.

The sensor 40 may be further provided with a manual override device. For example, there may be a flap or cover which is placed over the sensor so that it does not sense any ambient light. This may, for example, cause the heater 30 to remain on continuously until the manual override is removed.

As shown in FIG. 2, the controller 42 may be located inside the housing 34. The sensor 40 may be also disposed within the housing 34 and extend outside the housing 34 through an aperture in the housing 34. However, it is contemplated that the controller 42 and sensor 40 of the photoelectric control may be located anywhere and be in electrical communication with the heating element 32. In the event that the sensor and the controller are located inside the housing 34, the housing 34 may include insulation between the heating element 32 and the photoelectric controller in order to prevent the photoelectric controller from being damaged by heat from the heating element 32. It is also contemplated that the switch 38 may be located adjacent the climate control device 20 as illustrated in FIG. 2, or it may be incorporated and housed within the housing 34.

Figure 3:
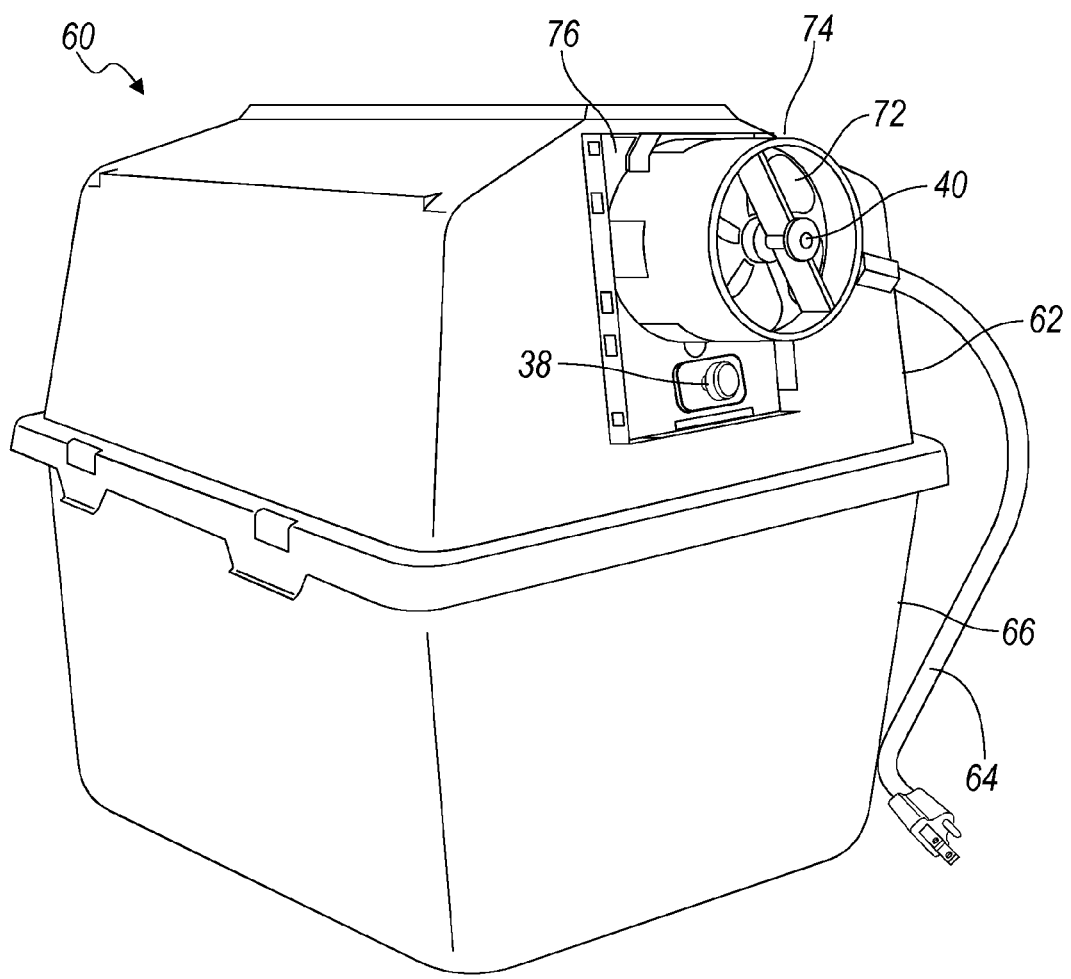
FIG. 3 illustrates an exemplary pet house including a cooling device of the present invention.

Turning now to FIG. 3, FIG. 3 illustrates an alternate pet house which may include a climate control device 20 of the present invention. FIG. 3 depicts an alternate embodiment of the present invention which includes a cooling device 70 for cooling the pet house. While a heater 30 and cooling device 70 are illustrated, it is also contemplated that the climate device 20 of the present invention may also include any other suitable device for moderating the environment, such as a humidifier or de-humidifier, for example.

The pet house 60 includes a upper enclosure wall 62 and a lower enclosure wall 66. The upper and lower enclosures 60 and 66 define a pet shelter with an interior region adapted to providing shelter to a pet. The pet house 60 may be constructed of any material which would provide shelter to a pet, as well as be adapted to be exposed to the environment. It is contemplated that the pet house 60 may be constructed of plastic or composite material, or any material suitable for a pet house.

FIG. 3 illustrates the cooling device 70 which may include a fan 72 enclosed in a fan housing 74. The fan housing 74 may be attached to or integrally formed with a flange 76. The flange may be used to mount the cooling device 70 to the pet house 60. The cooling device 70 may be located on the inside of the pet house 60 or pet shelter 10, or the cooling device may be located outside and provide convective cooling through an aperture in the pet house 60 or pet shelter 10.

It is contemplated that the cooling device 70 may also include a sensor 40 and a controller 42 comprising a photoelectric controller, as described above in conjunction with the climate control device 20 and heater 30. The sensor 40 may also be a light sensor which detects ambient light and generates an output response due to a threshold level of ambient light. The operation of the cooling device 70 may be controlled by the photoelectric controller. For example, the fan 72 may be turned on when the photoelectric controller senses a threshold level of ambient during the day. The cooling device 70 may then be turned off when the threshold level of light is below a certain threshold. Again, the cooling device 70 may be coupled with a switch 38, such as a dimmer switch or an on/off switch.

The climate control device 20 may also include a power supply 64, as shown in FIG. 3. The power supply 64 may be encased in a flexible sheath in order to prevent damage to the electrical supply. The casing may also prevent damage caused by the pets if the pets try to bite or scratch the power supply 64. The power supply 64 may be covered in a flexible metal casing, or coated with another durable material.

Figure 4:
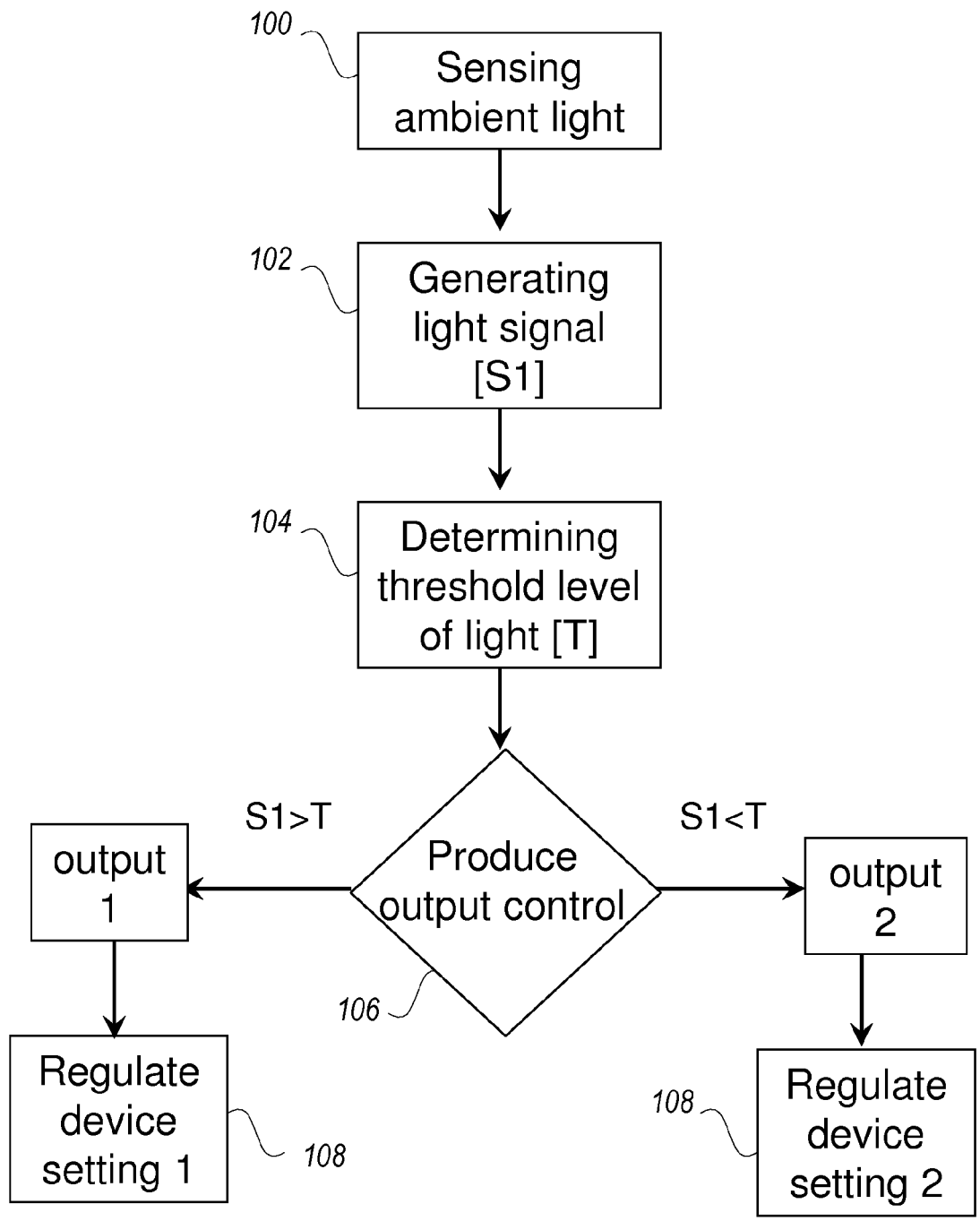
FIG. 4 illustrates a flowchart detailing a method of moderating the temperature of a pet shelter using the climate control apparatus of the present invention.

Turning now to FIG. 4 which describes a method of moderating the temperature of the pet shelter using a climate control device. In the first step 100, the ambient light is sensed. The light may be sensed using a photoelectric sensor, such as a dusk to dawn sensor.

In the second step 102, a light signal S1 is generated. The controller receives the light signal S1 generated by the light sensor and determines in step 104 the threshold level of ambient light T. The controller then in step 106 produces a controlled output by comparing the light signal S1 to the threshold level of light T. Where the light signal S1 is less than T, the controller produces a first output. Where the light signal S1 is greater than T, the controller produces a second output.

The controller output 1 and output 2 from step 106 regulate the climate control device in step 108 between at least a first and second setting in response to the output control.

Where the climate control device is a heater, including an electrical resistive heating element, the first setting may be such that the heater is on and providing heat to the pet shelter where the ambient light is below a threshold level of light. Where the device is a cooling device, the first setting may be such that the fan element is on and cooling the pet shelter where the threshold level of ambient light is above the threshold level.

It is contemplated that there may be more than a first and second output in step 106 and more than a first and second setting of the climate control device in step 108. For example, where the device is a heater and the ambient light is above the threshold, the heater may be turned to a lower level providing less heat. However, it may still be on. Or, alternatively, where it is below a threshold level of light, the heater may be at an additional setting where it is providing a greater amount of heat.

The method of moderating the temperature of the pet shelter may include additional steps not shown herein, such as where a thermostatic controller is coupled to the climate control device so that the first output or second output is not achieved unless a threshold temperature is met. It is contemplated that the method of moderating the pet shelter may be coupled with many sensing devices not described here that are capable of regulating the climate of a pet shelter enclosure.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for moderating the environment of a pet shelter comprising:
    a climate-control device configured for attachment to the pet shelter and adapted to regulate the temperature within the pet shelter; and
    a control element in electrical communication with the device, and operable from outside the pet shelter to adjust the device based on ambient light input, the device adjustable between at least a first and second setting,
    wherein the environment of the pet shelter is automatically regulated based on the ambient light outside the pet shelter.

2. The apparatus according to claim 1 wherein the device is a heater including an electrical resistance heating element, the heating element being contained within a housing, the heater adapted to provide heat to the pet shelter.

3. The apparatus according to claim 2 wherein the heat provided to the pet shelter creates a temperature gradient across the pet shelter in order to provide the pet a variable amount of heat.

4. The apparatus according to claim 2, wherein the heating element is an infrared light.

5. The apparatus according to claim 2 wherein the wherein below a threshold level of ambient light, the heater is set at the first setting such that the heater is on and providing heat to the pet shelter.

6. The apparatus according to claim 1 wherein the device is a cooling device including a fan element.

7. The apparatus according to claim 6 wherein above a threshold level of ambient light, the cooling devices is set at the first setting, such the fan element is on and cooling the pet shelter.

8. The apparatus according to claim 1 wherein the control element includes photoelectric control element with a light sensor configured to detect ambient light, the light sensor generating a signal responsive to the detected ambient light.

9. The apparatus according to claim 8 wherein the photoelectric control element further includes a light detection control circuit in communication with the light sensor, the control circuit generating an output in response to a threshold of ambient light.

10. The apparatus according to claim 9 wherein the control circuit is in communication with the device and the control circuit output regulates the device between at least the first and second setting.

11. The apparatus according to claim 8 wherein the control element is disposed within the housing and extends through an aperture in the housing.

12. The apparatus according to claim 8 wherein the control element may be manually overridden in order to provide continuous heat to the pet shelter.

13. The apparatus according to claim 1 wherein the device is configured for attachment to the exterior surface of the pet shelter and adapted to be located substantially outside the pet shelter, the device including a generally weather-proof housing.

14. The apparatus according to claim 1 further comprising an electrical supply connected to and providing electrical power to the heater, the electrical supply being encased in a flexible metal sheath in order to prevent damage to the electrical supply.

15. A method of moderating the temperature of a pet shelter using the apparatus of claim 1 comprising the steps of:
    A) sensing ambient light;
    B) generating a signal responsive to the ambient light;
    C) determining a threshold level of light;
    D) producing a control output based on the sensed level of ambient light condition; and
    E) regulating the apparatus between at least a first and second setting in response to the control output.

16. A heated pet shelter comprising:
    an enclosure having at least two walls and an entrance for allowing the pet entry and exit, an interior region of the enclosure configured to provide shelter to the pet, and an exterior surface adapted to be exposed the environment;
    a heater configured for attachment to the exterior surface of the enclosure and adapted to be located substantially outside the pet shelter, the heater including a generally weather-proof housing;
    an electrical resistance heating element contained within the housing and adapted to provide heat to the enclosure; and
    a control element in electrical communication with the heating element and operable from outside the pet shelter to adjust the heating element,
    wherein heat generated by the heater is provided to the enclosure and is automatically adjustable such that the heater is configured to provide variable heat in response to a sensed ambient light condition.

17. The pet shelter according to claim 16 wherein the control element includes photoelectric control element with a light sensor configured to detect ambient light, the light sensor generating a signal responsive to the detected ambient light.

18. The pet shelter according to claim 17 wherein the control element further includes a light detection control circuit in communication with the light sensor, the control circuit generating an output in response to a threshold of ambient light.

19. The pet shelter according to claim 18 wherein the control circuit is in communication with the heater and the control circuit output regulates the heater between at least a first and second setting.

20. The pet shelter according to claim 16 wherein the control element is disposed within the housing and extends outside through an aperture in the housing.

* * * * *